United States Patent [19]

DeTorre

[11] Patent Number: 4,487,350

[45] Date of Patent: Dec. 11, 1984

[54] METHOD AND APPARATUS FOR CUTTING PATTERN SHAPED HOLES IN GLASS SHEETS

[75] Inventor: Robert P. DeTorre, Pittsburgh, Pa.

[73] Assignee: PPG Industries, Inc., Pittsburgh, Pa.

[21] Appl. No.: 483,077

[22] Filed: Apr. 7, 1983

[51] Int. Cl.$^3$ ............................................. C03B 33/04
[52] U.S. Cl. ..................................... 225/2; 225/93.5; 225/96.5; 225/105
[58] Field of Search ................. 225/2, 96.5, 93.5, 104

[56] References Cited

U.S. PATENT DOCUMENTS

| | | | |
|---|---|---|---|
| 3,178,085 | 4/1965 | Jochim | 225/2 |
| 3,845,676 | 11/1974 | Pierce | 82/1.3 |
| 4,033,490 | 7/1977 | Ulivi | 225/2 X |
| 4,285,451 | 8/1981 | Ferraino | 225/2 |
| 4,297,059 | 10/1981 | Miyanaga | 408/202 |
| 4,371,103 | 2/1983 | Siemens et al. | 225/2 X |

Primary Examiner—Frank T. Yost
Attorney, Agent, or Firm—Donald Carl Lepiane; William D. West

[57] ABSTRACT

A method and apparatus for cutting pattern shaped holes in glass sheets is disclosed in which a pair of continuous parallel lines are scored on the upper surface of a glass sheet in horizontal orientation so that the outermost score line defines the periphery of the pattern hole. A pair of templates having opening coincidental but smaller than the pattern hole is clamped on both the upper and lower surfaces of the glass sheet so that the outermost score line is located between the clamped plates while the innermost score line is exposed. A force is applied to the exposed area of the glass sheet to remove the glass from the pattern hole. The glass severs at both the inner and outer score lines to produce the pattern shaped hole. Breakout is additionally assisted by thermal gradients introduced in the glass sheet by applying opposing moments to the glass.

20 Claims, 4 Drawing Figures

METHOD AND APPARATUS FOR CUTTING PATTERN SHAPED HOLES IN GLASS SHEETS

BACKGROUND OF THE INVENTION

1. Field of the Invention

This invention relates to a method and apparatus for cutting holes in glass sheets and, in particular, cutting pattern shaped holes.

2. Description of the Technical Problems

Pattern shaped holes in glass sheets are difficult to produce consistently, even under favorable circumstances. Although conventional scoring has been used to cut internal patterns, once the pattern is scored in the glass, removing the center portion becomes a problem. Damage is often caused to the exterior periphery portion which is the very portion desired to be preserved. Highly skilled experts have, in some cases, been able to cut holes in glass with conventional scoring and breakout; however, such methods are not practical for mass production.

A number of methods for producing circular holes in glass have been developed. One such apparatus is disclosed in U.S. Pat. No. 4,297,059 to Miyanaga. The Miyanaga invention produces a circular cut in the glass to a predetermined depth. After the cut has been made, the apparatus is removed and the glass is struck adjacent to the circular cut in order to break loose the glass disc enclosed by the cut. The edge or margin of the hole is then smoothed by grinding or polishing. The Miyanaga patent teaches rotating a circular saw or glass cutter in order to cut the glass.

An attempt to produce oval holes in glass sheets is shown in U.S. Pat. No. 3,845,676 to Pierce. The Pierce apparatus provides a device for cutting ovals or circles in sheet material, but does not provide for the breakout of the hole or pattern cut made by the operation of the device.

One of the main problems with the breakout as previously mentioned is that the edge portion which is intended to be saved is often destroyed unless great care is taken that the score produced in the glass does not run through the edge portion.

A number of inventions have been made to produce pattern shaped glass pieces; however, the purpose of those inventions is to produce a pattern shaped piece, not a hole, and the edge portion is removed rather than preserved.

One method for making a pattern piece of glass which produces a wasted edge portion in shown in U.S. Pat. No. 3,178,085 to Jochim. The Jochim device is a method and apparatus to provide a scoring of the pattern with the subsequent pressing of the glass in "cookie cutter" fashion to sever the edge portion from the pattern piece to be saved.

SUMMARY OF THE INVENTION

The invention provides a method and apparatus for cutting pattern shaped holes in glass sheets in a manner so that the process may be automated and is capable of mass production techniques. The apparatus includes a pair of templates each having a pattern shaped hole portion corresponding to, but smaller than, the pattern shape to be produced in the sheet of glass. The apparatus further includes a pick or pointed tool for breaking the center portion of the glass in the pattern shaped hole. The method includes producing a pair of continuous constant spaced score lines in the sheet of glass with the outermost score line corresponding to the shape of the pattern cut hole and the inner score line provided to enhance the breakout of the hole portion. By clamping the pattern shaped sheets so that the edge of the hole in the sheet is between and constantly spaced with respect to the outer score line and by applying pressure to the clamps, continuing to hold pressure on the sheets on either side of the major surfaces of the glass to be cut and by applying a force to a pointed tipped tool, pick or other breakout device, the center portion of the glass is broken to sever the glass at the outer score to produce the pattern shaped hole.

The glass breaks so that both the inner and outer score lines are severed. Any residual pieces of glass are removed and the pattern shaped hole is further processed by smoothing, grinding or edging as desired. The workpiece with the pattern shaped hole could then be tempered or further processed.

The clampable templates can be metal sheets with exterior holding clamps or they could be metal sheets having apertures which are connected to a vacuum manifold. A vacuum or negative pressure applied to the apertured surface securely holds and clamps the glass sheet between the templates. The vacuum hold down method appears to be more adaptable to mass production techniques than would be an exterior clamping.

In order to enhance the breakout of the center position, it has been shown that cooling of the center portion to be removed from the pattern hole e.g. by using a rapid release of pressurized gas such as carbon dioxide that the chilling of the glass surface of the center portion, allows greater speed and accuracy in the eventual breakout. Additional methods for assisting breakout include scoring across the center portion, using a carbide tipped tool and using a tool having an oscillating tip.

In one embodiment a pair of carbide cone points are positioned opposite and directed toward each other with the glass therebetween. By applying a force to the points, breakout is accomplished.

DESCRIPTION OF THE PREFERRED EMBODIMENT

Figure 1:
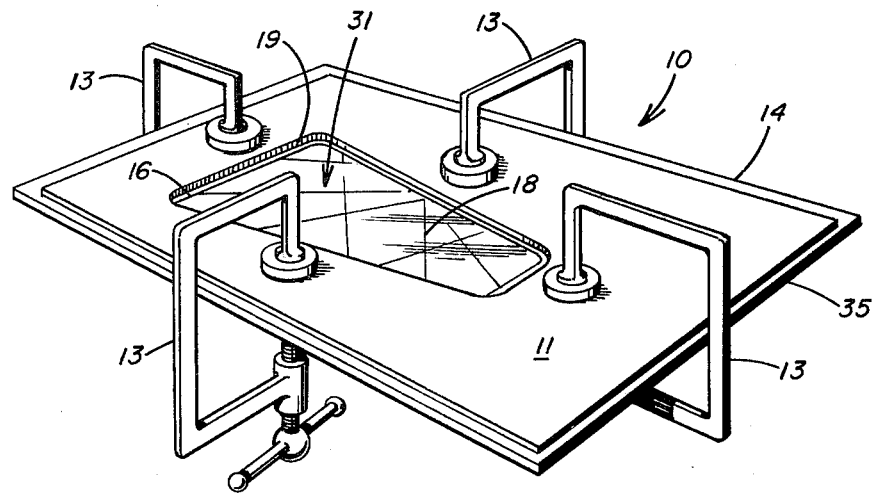
FIG. 1 is a perspective view of one embodiment of the clamping apparatus of the invention in which the hold down sheets are secured and pressure applied by means of a plurality of C-clamps.
Figure 2:
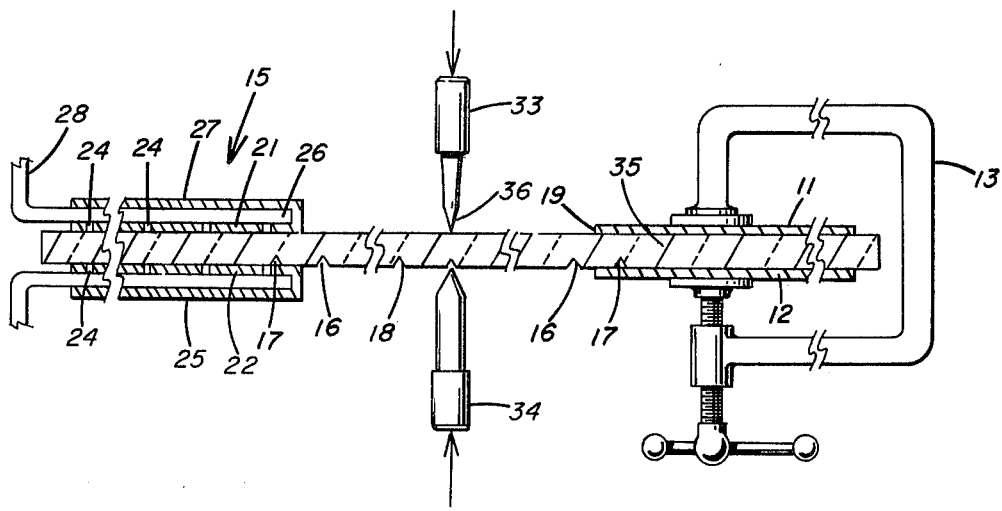
FIG. 2 is an end sectional view of the apparatus in which the score lines are shown as greatly exaggerated indentations in the glass surfaces and in which both direct pressure and vacuum hold down is shown with opposed conical tipped points.

The apparatus for the invention includes generally a hold down or clamping structure and a breakout for glass severing structure. In the first embodiment, the hold down structure is depicted generally in FIG. 1 at numeral 10. The hold down structure 10 includes an upper template 11, a lower template 12 as shown in FIG. 2, and conventional C-clamps 13. A glass sheet 14 is placed between hold down templates 11 and 12 as shown in FIGS. 1 and 2. Hold down sheet 11 and hold down sheet 12 are essentially identical and interchangable and are flat steel sheets having an opening machined through the major surfaces.

Glass sheet 14 as shown in FIGS. 1 and 2 is provided with score lines 16 and 17 and additional cross score lines 18. Upper and lower hold down templates 11 and 12 as previously mentioned, are flat sheets having a portion removed from the sheet leaving interior edge 19 forming a pattern shape. The closed interior edge 19 is slightly smaller than the pattern cut hole desired in the glass sheet 14 defined by outer score 17. In the preferred embodiment, hold down sheets 11 and 12 are flat mild steel sheets of a thickness sufficient to withstand the clamping force and breakout forces applied, yet thin and light weight enough to allow for easy handling. The portion removed from sheets 11 and 12 is removed by conventional cutting methods. Hold down apparatus 10 is supported at a rigid station or table (not shown) with the apparatus arranged in a generally horizontal orientation with portions of lower hold down sheet 12 resting upon the support structure. The opening in templates 11 and 12 is sufficiently free of any supporting structure so that upon eventual breakout, the glass pieces will fall free of the apparatus 10.

In FIG. 2 it is shown that score lines 16 and 17 are introduced in the glass at a prior operation by conventional means well known in the art. The types of scoring, among others, which would be acceptable may be found in the following U.S. Pat. Nos.: 4,057,184; 3,865,673; 3,065,294; 3,865,293; 3,797,340; 3,598,899 and 3,537,345 which teachings contained therein are hereby incorporated by reference. FIG. 2 greatly exaggerates the indentation produced by conventional scoring. It should be noted that the score lines 16 and 17 are shown on the lower surface of the glass sheet in FIG. 2 as the breakout is best accomplished by having the breaking force directed on the opposite side from the scores lines 16 and 17. The periphery of the pattern shaped hole to be removed is defined by outermost spaced closed score line 17 whereas innermost spaced closed score line 16 is introduced into the glass about 0.25 inch (0.635 cm) from score line 17 to assist breakout in that the glass severs at inner score line 16 prior to severing at score line 17, thereby producing a pristine edge in glass sheet 14. The pattern shaped hole is defined by outer score line 17. Hold down sheets 11 and 12 have the innermost edge 19 as shown in FIGS. 1 and 2 located between and substantially parallel to score lines 16 and 17. The hold down sheets 11 and 12 thus extend over outer score 17 but not inner score 16. Accordingly, the open portion in templates 11 and 12 must necessarily be smaller than the pattern shaped hole which is desired in the glass sheet 14.

The hold down structure 10 in the preferred embodiment provides direct sandwiching pressure on the glass by using C-clamps or other means of applying opposed pressure to hold down sheets 11 and 12 in clamping relationship to work piece 14. It is to be understood that additional means of applying direct pressure to sheets 11 and 12 include hydraulic power cylinders, air power cylinders, lever actuated clamps and even bolts extending through the templates could be used as long as direct pressure is applied in clamping relationship to templates 11 and 12. Pads or coatings could be placed between the glass sheets and the templates to eliminate marring of the glass surfaces.

In a further embodiment of the invention, the clamping necessary for producing the pattern shaped cuts in glass sheets can be effectuated by the use of a vacuum hold down 15 as depicted in FIG. 2. In the vacuum hold down structure 15, a top hold down sheet 21 and bottom hold down sheet 22 having an inner pattern edge 23 similar to direct pressure hold down sheets 11 and 12 are placed on the top and bottom major surfaces of a glass sheet 14 so that the inner edge 23 of the hold down sheets center removed portion is located between outermost score line 17 and innermost score line 16 as depicted in FIG. 2. Upper vacuum hold down sheet 21 and lower vacuum hold down sheet 22 are provided with a number of apertures 24 and 25. Apertures 24 and 25 are in pneumatic communication with manifold plenum 26 which is isolated from the ambient air pressure by manifold structure 27. Manifold plenum 26 is in pneumatic communication with a source of reduced air pressure by means of vacuum lines 28 and 29 as shown in FIG. 2. When a negative pressure (suction) is produced in vacuum lines 28 and 29 and upper and lower vacuum hold down sheets 21 and 22 are placed in clamping relation with workpiece 14 as depicted in FIG. 2, vacuum hold down sheets 21 and 22 securely clamp work piece 14 therebetween. The ambient air pressure in thereby exerted upon the outer surface of manifold 27 which is rigidly attached to vacuum pressure hold down sheets 21 and 22. The vacuum and/or direct pressure hold down mechanisms are depicted diagrammatically in FIGS. 3 and 4 on the left side. It is understood that the vacuum hold down structure as previously explained is not restricted to that particular structure but to any mechanism which by applying vacuum to apertured sheets in clamping relationship to the work piece 14 produces a clamping pressure by vacuum means.

The breakout assisting structure will now be explained in detail. It is to be understood that given the clamping relationship as previously described, it is possible to break the exposed area 31 of the glass 14 by applying any breaking force to exposed area 31. The clamping structure directs the breakout by means of the double scoring so that the glass severs first at innermost score line 16 and secondly at outermost score line 17 which is located between the clamping plates 11 and 12 (direct pressure) or plates 21 and 22 (vacuum pressure).

Figure 3:
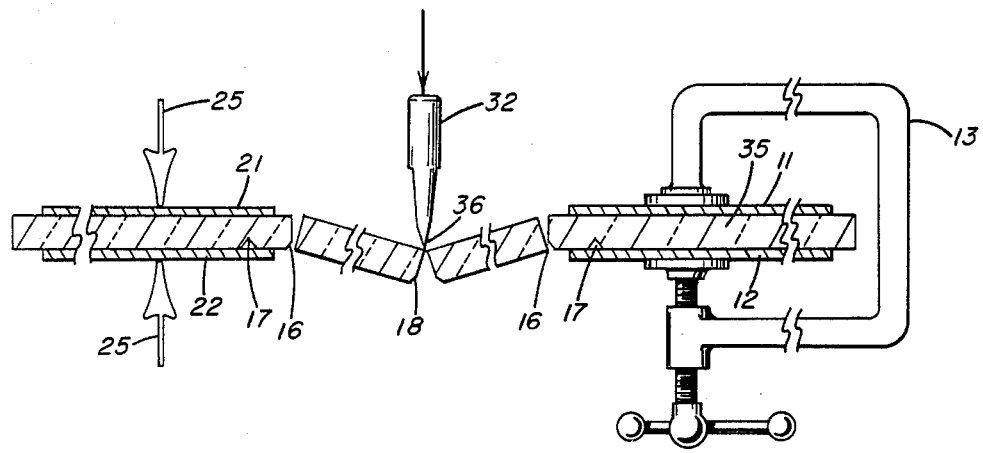
FIG. 3 is an end sectional view of the apparatus in which the center portion of the hole pattern to be removed is shown in the initial breakout stage with the hold down mechanism shown both pictorally as well as diagrammatically.
Figure 4:
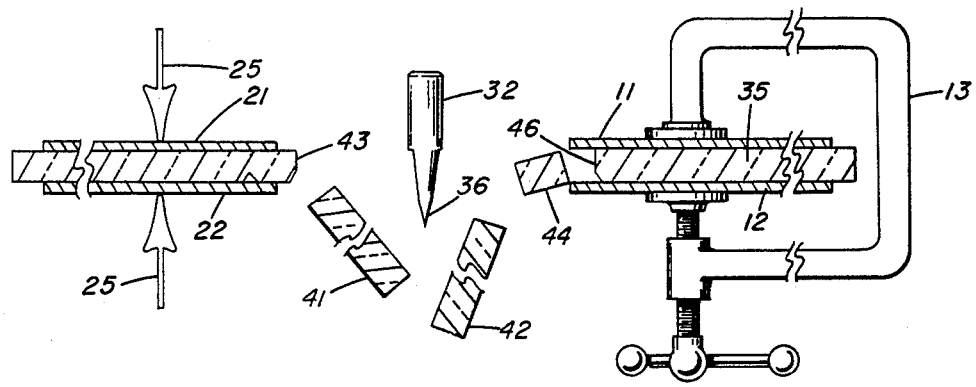
FIG. 4 is an end sectional view of the apparatus similar to FIG. 3 in which both partial and complete breakout from the score lines is depicted as the interior glass portion in the hole pattern is totally removed.

One could, for example, strike the center portion 31 of the glass sheet as depicted in FIGS. 1, 3 and 4 with a mallet, pick, chisel, or pointed tool. In order to facilitate the breakout and make the method and apparatus for producing pattern shaped holes in glass sheets adaptable to mass production, additional structures for breakout have been developed. One of these structures includes having a pair of pointed carbide tipped tools as depicted in FIG. 2 directly opposed to each other with the points 36 opposite one another and directed toward each other. When a load or force is applied to the tools to bring the points 36 together, breakout is accomplished. In another embodiment as shown in FIGS. 3 and 4, a force is applied to a single pointed tool by using a power cylinder or other means to apply a downward force to the tool 32 as shown in FIGS. 3 and 4. In FIG. 2, opposed carbide tipped tools 33 and 34 have a pointed portion 36 which it has been shown to have the best results if the tip 36 has an angle of about 60°. Tip 36 of tools 32, 33 and 34 is made of a carbide or other hard material withstands repeated breakout without becoming dull.

Additional ways of accomplishing breakout include applying a thermal gradient to the glass prior to breakout by either heating or cooling the unclamped area of the glass. One means of applying such a thermal gradient is to chill center portion 31 of the glass sheet after it is clamped as shown in FIG. 1. The chilling could be accomplished by applying ice or by releasing carbon dioxide under pressure or by any other suitable means. The differential temperature between center portion 31 and periphery edge portions 35 of glass sheet 14 produces additional stresses at score lines 16 and 17 which aid the breakout of the center portion 31.

It is assumed that an oscillating point could be used to apply an oscillating chipping force to center portion 31 to assist breakout.

The method of producing a pattern shaped hole in glass will now be explained. Prior to clamping work piece 14 between direct pressure hold down sheets 11 or 12 or vacuum hold down sheets 21 and 22, the glass is scored using conventional glass pattern cutters. The cutting wheel (not shown) could be installed in a modified cutting wheel holder having a double barrel to allow two scores simultaneously. It has been shown that if the outermost score 17 is applied with heavier pressure than innermost score 16, then the breakout is more easily accomplished. Innermost score 16 called the break away score assists the breakout and is located outside of the clamping structure. The scoring of the double scores could also be accomplished in a two step process rather than by simultaneous scoring. The scoring could be done manually as well as by using conventional automatic pattern glass scoring machines. Additional breakout scores 18 could also be placed in center portion 31 of glass 14 as shown in FIG. 1 to aid in breakout. The additional breakout scores 18 can be placed at random across the open portion of 31 of glass sheet 14 as depicted in FIG. 1 or they could be made in a symmetrical pattern. It has been discovered that a cross pattern having four separate score lines in the interior portion 31 of glass sheet 14 in which the four scores are placed in the glass at approximately 90° relationship to one another in an "X" or "star" pattern produced good results.

As shown in FIGS. 3 and 4 breakout can be accomplished by applying a force both to the scored side of glass sheet 14 as well as to the unscored major surface on the opposite side of the scored side. In order to accomplish the breakout by applying the force opposite to the scored side of the glass sheet, the scored glass is placed scored side down on lower hold down sheet 12, or vacuum hold down sheet 22 as shown in FIG. 2 and the force is applied on the upper surface. In that method, after applying the breaking force the inside score line is severed and then by removing the upper template 11, the outside score 17 is opened leaving a pristine edge. In the previously described method, dry carbon dioxide applied to the center of the scored window within the machine frame produces a temperature gradient which assists the breakout of the glass. Moving the carbon dioxide in a circular manner as it is applied, assists in chilling the area 31 quickly.

Once the pattern cut is produced, the glass sheet can then be placed back onto a pattern cutter to be positioned and scored to a proper outer dimension for an automobile window or the like. Additional processes such as sanding, edging, smoothing or grinding can be applied to the work piece 14.

As can be appreciated, the invention is not limited to the above examples which are presented for illustration purposes only, but only by the claims herein.

I claim:

1. A method for producing pattern shaped holes in a glass sheet having a first and a second major flat surface, the method comprising the steps of:
   making a first closed score in the first major flat surface of the glass sheet, said first score defining the pattern shaped hole,
   making a second closed score in the first major flat surface of the glass sheet said second score inside of said first score and spaced therefrom;
   applying a clamping pressure on both said first and said second surfaces of the glass sheet between said first and said second scores but not extending within the area bounded by said second closed score; and
   fracturing the glass within said second score on the second surface of said glass sheet to break away the portion of the glass sheet defined by said first closed score.

2. The method for producing pattern shaped holes in glass sheets as described in claim 1 wherein said step of making a first closed score and said step of making a second closed score being accomplished simultaneously.

3. The method for producing pattern shaped holes in a glass sheet as described in claim 1 wherein said first closed score is deeper than said second closed score.

4. The method for producing pattern shaped holes in glass as described in claim 1 wherein said clamping pressure is directed through a pair of rigid flat templates positioned on either side and contacting the major surface of said glass sheet and wherein said clamping pressure is exerted by pressure means applied to said template sheets.

5. The method for producing pattern shaped holes in glass as described in claim 4 wherein said pressure applying means includes using a plurality of pressure selectively adjustable C-clamps.

6. The method for producing pattern shaped holes in glass as described in claim 1 wherein said clamping pressure is provided by a pair of apertured template sheets having means for applying suction to said apertures.

7. The method for producing pattern shaped holes as described in claim 1, wherein said fracturing step is accomplished by placing a pointed member against the unclamped portion of the glass sheet and applying a force to said pointed member.

8. The method for producing pattern shaped holes in glass as described in claim 7, wherein said pointed tool tip is carbide and has a tip angle of approximately 60°.

9. The method for producing pattern shaped holes in glass as described in claim 1 wherein said fracturing step is accomplished by applying force to a pair of pointed tipped tools oppositely oriented on either side of the glass sheet and having their tips directed toward one another.

10. The method for producing pattern shaped holes in glass as described in claim 1, further comprising a cross scoring step before exerting of clamping pressure step, said cross scoring step comprising making a cross score in the first major flat surface of the glass sheet within the boundaries of said second closed score.

11. The method as described in claim 1 further including chilling the unclamped portion of the glass sheet.

12. The method as described in claim 1 further comprising heating the unclamped portion of the glass sheet.

13. A method for producing pattern shaped holes in a glass sheet having a first and a second major flat surface, the method comprising the steps of:
   making a first closed score in the first major flat surface of the glass sheet, said first closed score defining the pattern shaped hole;
   making a second closed score in the first major flat surface of the glass sheet, said second score inside of said first score and spaced therefrom;
   applying a clamping pressure on both said first and said second surfaces of the glass sheet, between said first and said second scores, but not extending within the area bounded by said second closed score; and
   fracturing the glass sheet within said second score on the first surface of said glass sheet.

14. Apparatus for producing pattern shaped holes in glass sheets having a first and a second major flat surface wherein said first major flat surface is provided with at least two closed parallel scores in said first major flat surface, the apparatus comprising:
   a clamping means for exerting clamping pressure outside of the inner score portion of the glass sheet, said clamping pressure means applied to both said first and said second surfaces of said glass sheet and extending between said closed parallel scores, and
   a breaking means for breaking the unclamped portion of the glass sheet as defined by said outer closed score.

15. The apparatus as described in claim 14 wherein said clamping pressure means comprises a pair of rigid templates each having a pattern shaped hole removed therein corresponding to the pattern shaped holes desired in the glass and wherein said pattern shaped hole in said templates is of a smaller size than said pattern shaped hole in said glass sheet.

16. The apparatus as described in claim 15 wherein said pressure means comprises pressure selectively adjustable C-clamps simultaneously exerting pressure upon said first and said second template sheets.

17. The apparatus as described in claim 14 wherein said clamping pressure means includes a pair of apertured template sheets having means for applying suction to said apertures to pressure engage said glass sheets between said apertured templates.

18. The apparatus as described in claim 14 wherein said breaking means is a pointed tool wherein said point of said pointed tool is directed toward said unclamped portion of the glass sheet.

19. The apparatus as described in claim 16 wherein said tip of said pointed tool is provided with a 60° angle and wherein said tip is composed of carbide material.

20. The apparatus as described in claim 12 wherein a pair of pointed, tipped tools oppositely oriented on either side of the glass sheet and having their tips directed toward one another.

* * * * *